Aug. 6, 1935.  O. E. KOEHLER  2,010,432
TAPPER TAP
Filed Aug. 16, 1934
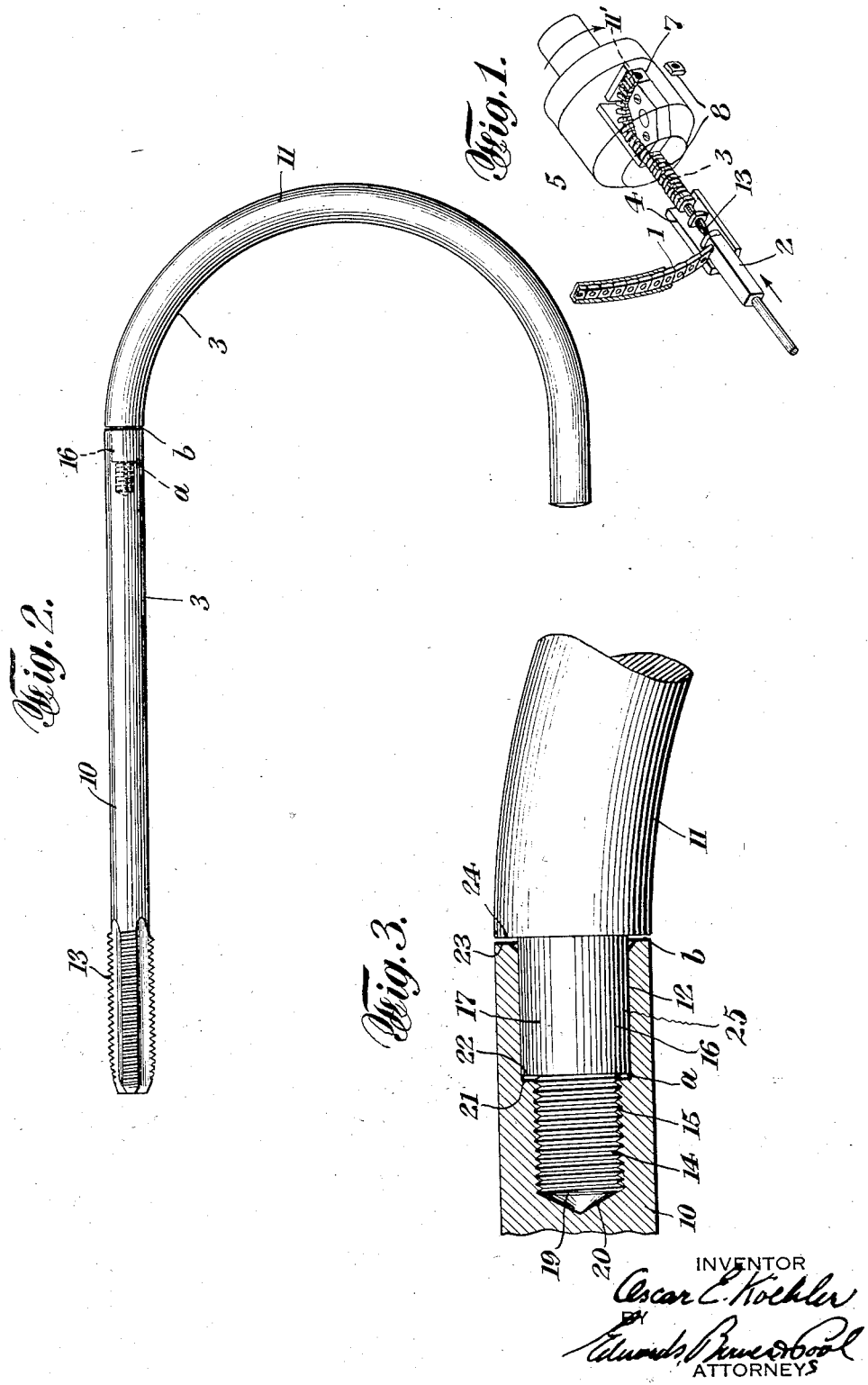
INVENTOR
Oscar E. Koehler
BY
Edmonds Bruerwood
ATTORNEYS Patented Aug. 6, 1935

2,010,432

UNITED STATES PATENT OFFICE 2,010,432

TAPPER TAP

Oscar E. Koehler, Greenfield, Mass., assignor to Greenfield Tap and Die Corporation, Greenfield, Mass., a corporation of Massachusetts Application August 16, 1934, Serial No. 740,093

3 Claims. (Cl. 10—129)

This invention relates to tapper taps and particularly to such taps used in the threading of nuts in automatic machinery.

In such machines the tap has a straight shank for the tapping and a curved shank either holding the tap against rotation while the nut revolves or turning the tap while the nut is held against rotation. The blank nut is automatically fed into an injector which forces it onto the tap and holds the nut while it is being tapped. The threaded nut passes up the shank of the tap and is ejected off the other end. Trouble is encountered when the blank nut jams on the tapping threads and grips the tap. Not only are the tapping threads damaged but other parts of the machine become clogged and dislocated under the strain, causing an additional waste of time as well as expensive repairs.

The object of this invention is to provide a tap which in the case of the jamming of a nut or other obstruction will avoid injury to the tapping threads and the machine parts.

A further object of the invention is to provide such a tap in which the straight shank is precisely true with the cutting threads so as to maintain required alinement between these parts for accurate work.

In the accompanying drawing:

Fig. 1 is a partial perspective view of a nut tapping machine with a 90° bent tap;

Fig. 2 is a vertical section of a 180° bent tap; and

Fig. 3 is a detail vertical section of a portion of the tap in Fig. 2.

Referring to the diagrams in detail, Fig. 1 illustrates one form of nut tapper in which the nut blanks 1 are fed into the injector 2, which by a reciprocating motion feeds the blanks one at a time onto the threads 13 of tap 3 and holds them in jaw 4 while they are being tapped. The threaded nuts 8 then pass up the shank 10 of tap 3 and continue around the 90° bent shank 11' and are ejected off the end of the shank through the discharge opening 7. The bent shank 11' may be bent in any arc that is greater than 90°. The tap is supported by the revolving head 5 and the threaded nuts 8, which the tap 3 is always filled with. The nuts 8 on the bent shank also serve to hold the tap 3 central. The revolving head 5 through the bent shank 11' drives or rotates the tap 3. In some machines the bent shank portion is carried around through 180°, and the tap is held stationary while the nut is rotated.

It is vital to maintain precisely accurate relation between the threading teeth of the tap and the straight portion of the shank throughout its full length. It is also desirable to provide for relief of the driving force in event of a nut jamming on the tapping threads so that the tap shank will be freed to avoid damage to the threads and the parts of the machine.

One form of the tap of this invention is shown in Figs. 2 and 3 with the bent section curved or hooked around through a full 180°. The straight shank 10 is separate from the curved shank 11 with the joint between the two formed by a reduced end or pilot shank 16 on the bent shank fitting into a corresponding recess 12 in the end of the straight shank. The pilot shank 16 has the further reduced and threaded end 14 adapted to screw snugly into the threaded recess 15 of the straight shank section 10. The cooperating threaded portions 14 and 15 are right-handed for taps cutting right-handed nuts and vice versa, so that the reaction of the work tends to tighten the threaded engagement. The threaded end 14 is of greater length than the depth of the recess 15 so that the end 19 bottoms against the end 20 of the recess and shoulder 21 of the recess is spaced from shoulder 22 at the root of the threaded end 14 maintaining a clearance $a$. Instead of providing a shoulder 21 the threaded portion 14 may, if desired, have substantially the same outside diameter as that of the cylindrical portion 17. A clearance $b$ is also provided between the shoulder 24 at the root of the smooth cylindrical portion 17 of the pilot shank 16 and the end 23 of the straight shank section 10. A small vent hole may be provided at the inner end of the threaded recess to release the trapped air when assembling the sections.

The predetermined point of weakness mentioned above is the root of the slender threaded shank 14 of bent shank 11 where it is not engaged by the threads 15 of the straight shank recess.

By this means the two opposite forces which occur when a nut jams on the tapping threads will meet in the threads 14 and 15, forcing the end 19 of the threads 14 against the inner end 20 of the threaded recesses 15. The torsional force being thus concentrated at the threads, the weakened area at space $a$ is sheered and the damaging strain is ended. The straight shank section and the bent shank section then are permitted to have relative rotation and are maintained in alinement by the journaling of the portion 17 of pilot shank 16 in the smooth portion 25 of recess 12. The machine is then stopped and the tap removed and the threaded section 14 which is left in the straight shank 10 is extracted and the straight shank saved.

To prevent the weakened area from being affected and possibly broken by any sidewise or angular forces the piston-like section 17 of the pilot shank 16 fits closely into the cylinder socket 25 of recess 12 in the straight shank section. This fitting accurately alines the bent shank section with the straight shank section. Thus any play between the sections, save that of torsion, is prevented.

The tapping threads because of their high speed must be made resistant to wear and the straight shank must be accurately machined, while the bent shank section has neither of these requirements. The bending of the shank portion 11 also has a tendency to interfere with the accuracy of the alinement of the straight portion with the cutting threads where these shank portions are integral. Where, however, as in the structure of this invention the straight shank section is separate, it may be made of hardened tool steel accurately ground to precisely close alinement and is unaffected by the bending of the shank section 11. This bent section may be separately formed and composed of any tough steel.

Although I have illustrated and described only a single form of the invention and have shown only one method of providing a predetermined point of weakness in a tap, I am aware of the fact that modifications can be made therein by any person skilled in the art without departing from the scope of the invention as expressed in the claims. Therefore, I do not wish to be limited to all the details of construction herein shown and described but what I do claim is:

1. A tapping device comprising a straight shank section having tapping threads thereon, a separate shank section with a bend for applying torque to said straight section, said sections having a joint at the junction of the bend and straight section including a reduced threaded end of a predetermined length on said bent shank section fitting into a threaded end socket of a predetermined shorter length in said straight shank section so as to slightly separate the adjacent ends of said sections and provide a point of predetermined weakness to torsional forces between said tapping threads and said bent shank section.

2. A tapping device comprising a straight shank section having tapping threads thereon, a separate shank section with a bend for applying torque to said straight section, said sections having a joint at the junction of the bend and straight section including a reduced end partly smooth and partly threaded and of a predetermined length on said bent shank section fitting into a correspondingly smooth and threaded socket of a predetermined shorter length in said straight shank section so as to provide a point of predetermined weakness to torsional forces between said tapping threads and said bent shank section.

3. A tapping device comprising an integral straight tap and shank section having a threaded portion and a longer smooth portion accurately alined with respect to said threaded portion, a separate section curved to apply torque to said straight tap and shank section, and a detachable connection comprising a socket in the end of said shank and a mating projection on one end of said curved section forming a point of predetermined weakness to torsional forces at the transition from the straight to the curved section.

OSCAR E. KOEHLER.